ized Patent

(12) United States Patent
Lau

(10) Patent No.: US 6,598,219 B1
(45) Date of Patent: Jul. 22, 2003

(54) METHOD AND MECHANISM FOR A TASK ORIENTED XML DATA MODEL

(75) Inventor: Christina P. Lau, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/413,148

(22) Filed: Oct. 6, 1999

(30) Foreign Application Priority Data

Nov. 30, 1998 (CA) .............................................. 2255017

(51) Int. Cl.⁷ ................................................ G06F 9/45
(52) U.S. Cl. ..................................................... 717/108
(58) Field of Search ............................... 717/104–109; 709/315

(56) References Cited

U.S. PATENT DOCUMENTS

| | | | | |
|---|---|---|---|---|
| 5,872,973 A | * | 2/1999 | Mitchell et al. | ............ 709/317 |
| 5,937,409 A | * | 8/1999 | Wetherbee | ...................... 707/1 |
| 6,083,276 A | * | 7/2000 | Davidson et al. | ........... 709/200 |
| 6,134,559 A | * | 10/2000 | Brumme et al. | ........ 707/103 R |
| 6,182,274 B1 | * | 1/2001 | Lau | ............................ 717/104 |
| 6,230,309 B1 | * | 5/2001 | Turner et al. | ................ 717/107 |
| 6,397,231 B1 | * | 5/2002 | Salisbury et al. | ........... 715/515 |

OTHER PUBLICATIONS

Baldonado et al., Metadata for Digital Libraries: Architecture and Design Rationale, 1997, ACM, pp. 47–56.*

Suzuki et al., Managing the Software Design Documents with XML, Sep. 1998, ACM, p. 127–136.*

Usdin et al., XML: Not a Silver Bullet, But a Great Pipe Wrench, Sep. 1998, ACM, p. 125–132.*

* cited by examiner

Primary Examiner—Kakali Chaki
Assistant Examiner—John Q. Chavis
(74) Attorney, Agent, or Firm—Roy W. Truelson

(57) ABSTRACT

A task oriented data model for an object oriented development tool. The data model comprises a task oriented structure which mirrors the task tree embodied in the user interface of the object development tool. The object development tool exports the data model as a document expressed in meta data language such as XML. The XML data model document comprises a series of data elements which are arranged according to a meta data model to mirror the user interface task tree. The meta data model is implemented in XML as a Document Type Definition and comprises containment relationships defined by XML constructs. The task oriented data model provides granularity for exporting and importing data elements, and also facilitates locating data elements of interest in the data model.

12 Claims, 2 Drawing Sheets

METHOD AND MECHANISM FOR A TASK ORIENTED XML DATA MODEL

REFERENCE TO RELATED APPLICATIONS

This application is related to commonly assigned co-pending application Ser. No. 09/413,609, to Christina P. Lau, entitled "Method and Mechanism for a Task Oriented Data Model", filed the same day as the present application.

FIELD OF THE INVENTION

The present invention relates to object oriented programming systems, and more particularly to a task oriented structure for a data model.

BACKGROUND OF THE INVENTION

Traditionally in the computer programming arts, program code and data have been kept separate. For example, in the well-known C programming language, units of program code are called functions, and units of data are called structures. In C the functions and structures are not formally connected, that is, a function can operate on more than one type of data structure, and more than one function can operate on the same structure.

Object-oriented programming, in contrast, deals with objects, in which program code and data are merged into a single indivisible entity or "object". An object is an instance of an implementation and an interface, which models a real-world entity. The object is implemented as a computational entity that encapsulates state and operations and responds to requests. The data and methods are implemented internally in the object. A business object for example is an object containing business methods (i.e. logic) and state that is intended for use within business applications.

Objects are built using an application program commonly referred to as an object builder tool. The object builder is a program which is used to define the business objects and generate the necessary definition and implementation files in IDL (Interface Definition Language), C++ and/or Java, as will be understood by those skilled in the programming arts.

Object builders utilize a data model which provides a template of the data structure for the objects. Object-oriented data models can be adapted to a wide range of different models by changing the definitions of meta-data, such as the objects and the task trees. Meta-data as will be understood by those skilled in the art comprises the self-descriptive information that can describe both services and information. With meta-data new services can be added to a system and discovered at run-time.

The object builder in the Component Broker™ toolkit from IBM utilizes a proprietary data model known as the Common Data Model (CDM), which is implemented as a binary file. In the object builder tool for Component Broker™, objects are processed by performing sets of user-defined operations in the form of task trees.

The binary file format of the Common Data Model yields some advantages such as rapid saving and loading of the data model. However, these advantages are offset by a number of disadvantages. First, the binary format of the Common Data Model or CDM is not human readable and as such the data model can only be examined by using the user interface in the object builder or by viewing the code generated from the binary file. Second, the data model must be imported or exported in its entirety, i.e. component parts of the data model cannot be imported or exported. This makes it much more time-consuming to perform impact analysis and to compare different model-generated outcomes. I-or example, to compare the modeling results obtained by modifying one object, it is usually necessary to import or export the entire data model, even though the data model is substantially unchanged in any respect other than the slightly altered object.

This problem has been addressed in other data models by using a proprietary language, for example, the known Rational Rose tool utilizes a Rose mdl format file to represent the meta-data for the data model. Because the mdl format has been well publicized, objects using the mdl format can be designed and analyzed by any modeling tool which supports mdl. Using a proprietary language such Rose mdl, the meta-data is organized so that the component parts of the data model, such as objects and task trees, can be imported and exported at various different levels of generality. However, using a proprietary language limits the interoperability between the data model and other tools as these other tools will need to use parsers that are compatible with the proprietary language in order to retrieve meta-data from the data model.

Accordingly, there remains a need for generating a data model which is not confined to a proprietary language.

BRIEF SUMMARY OF THE INVENTION

The present invention provides a mechanism for a task oriented data model for a development tool in an object oriented programming system.

According one aspect of the invention, the meta-data of the data model is represented using an open standard. Advantageously, by representing the meta-data using an open standard, conventional parsers for the open standard may be used to retrieve the meta-data. According to this aspect of the present invention, the data model takes the form of a document file expressed in Extensible Markup Language or XML. XML comprises a simplified subset of the Standardized Generalized Markup Language or SGML. Like SGML, but unlike other subsets of SGML such as Hypertext Markup Language (HTML), XML permits (i) users to add new defined tags to the tag set at will; and (ii) XML documents to be properly nested within one another to an arbitrary extent. In accordance with this aspect of the invention, the import and export utility in the object builder is implemented to express the data model as an XML document wherein the data elements are arranged according to a meta data model. According to this aspect of the invention, the meta data model comprises a Document Type Definition or DTD in XML.

According to another aspect of the invention, the data model incorporates a task oriented structure which mirrors the user interface in the object builder. The task tree for the user interface is represented using containment relationships defined by XML constructs specified in the Document Type Definition, i.e. the meta data model. For example, the properties and values in the SmartGuides™ under the Component Broker™ toolkit are represented according to this aspect of the invention as a tag with an identical label and value format. Advantageously, this task oriented data structure allows users to quickly locate and recognize the data element of interest in the data model. In addition, the task oriented structure of the data model provides the capability to export and import data elements with varying degrees of granularity.

According to an aspect of the invention, there is provided a task oriented data structure embodied in a program storage device for an object oriented application program, the object oriented application program having a user interface comprising a plurality of items, said items defining a sequence of tasks for creating one or more objects, said data structure comprising: (a) a data model expressed in the form of a document according to a meta data language; (b) said data model including a plurality of data elements; (c) each of said data elements corresponding to one of the tasks in said sequence of tasks; and (d) said data elements being arranged according to a meta data model, wherein said meta data model mirrors the sequence of tasks defined in the user interface. Said meta data model may means for validating each of said data elements and the arrangement of said data elements. Further, said meta data language may comprise XML or Extensible Markup Language, and said data elements being arranged according to containment constructs specified in said meta data model. Said means for validating may also comprise a Document Type Definition specified in XML. And, said containment constructs may comprise tag definitions according to XML.

There is also provided, in an application program for creating objects, the application program having a user interface comprising a plurality of items, said items defining a sequence of tasks for creating the objects, and said application program including an export utility for exporting document files, a export utility comprising: (a) means for exporting a document file expressed in a meta data programming language; and (b) wherein said document file comprises a plurality of data elements, each of said data elements corresponding to one of the tasks in said sequence of tasks, and said data elements being arranged according to a meta data model, wherein said meta data model mirrors the sequence of tasks defined in the user interface. Said meta data model may also include means for validating each of the data elements included in said document file. Said document file may also be expressed in XML or Extensible Markup Language, and said data elements being arranged according to containment constructs specified in said meta data file. And, said means for validating may comprise a Document Type Definition specified in XML.

According to another aspect of the invention, there is provided a computer program product for an object oriented application program for creating objects, the application program having a user interface comprising a plurality of items, said items defining a sequence of tasks for creating the objects, and said application program including an export utility for exporting document files, said computer program product comprising a program storage device; means recorded on said program storage device for instructing a computer to perform the steps of, (a) outputting a document file, said document file being expressed according to a meta data programming language; and (b) said document file comprising a plurality of data elements, each of said data elements corresponding to one of the tasks in said sequence of tasks, and said data elements being arranged according to a meta data model, wherein said meta data model mirrors the sequence of tasks defined in the user interface. Said meta data model may include means for validating each of the data elements in said document file. Said meta data language may comprise XML or Extensible Markup Language, and said data elements being arranged according to containment constructs specified in said meta data model. And, said means for validating may comprise a Document Type Definition specified in XML.

There is also provided a computer system for creating objects in an object oriented application program, the application program having a user interface comprising a plurality of items, said items defining a sequence of tasks for creating the objects, and said application program including an export utility for exporting document files, said computer system comprising: (a) means for outputting a document file, said document file being expressed according to a meta data programming language; and (b) said document file comprising a plurality of data elements, each of said data elements corresponding to one of the tasks in said sequence of tasks, and said data elements being arranged according to a meta data model, wherein said meta data model mirrors the sequence of tasks defined in the user interface. Said meta data model may include means for validating each of the data elements in said document file. Said meta data language may also comprise XML or Extensible Markup Language, and said data elements being arranged according to containment constructs specified in said meta data model. And, said means for validating may comprise a Document Type Definition specified in XML.

BRIEF DESCRIPTION OF THE DRAWINGS

Reference will now be made to the accompanying drawings which show, by way of example, preferred embodiments of the present invention, and in which.

DETAILED DESCRIPTION OF THE PREFERRED EMBODIMENT

The present invention comprises a task oriented structure for a data model suitable for object oriented programming. According to the invention, the task oriented data structure is implemented using the open standard language XML (Extensible Markup Language). The data model for an object is expressed as an XML document which is defined according to a meta data model. According to the invention, the meta data model is implemented as a Document Type Definition or DTD in XML. The XML document is compatible with the export and import utilities in development tools (e.g. object builder tool). It is a feature of the present invention that the task oriented structure mirrors the user interface in the object builder or development tool. In the following description, the task oriented data structure is described in the context of an object builder application which is in the "toolkit" for IBM's Component Broker software package.

Figure 1:
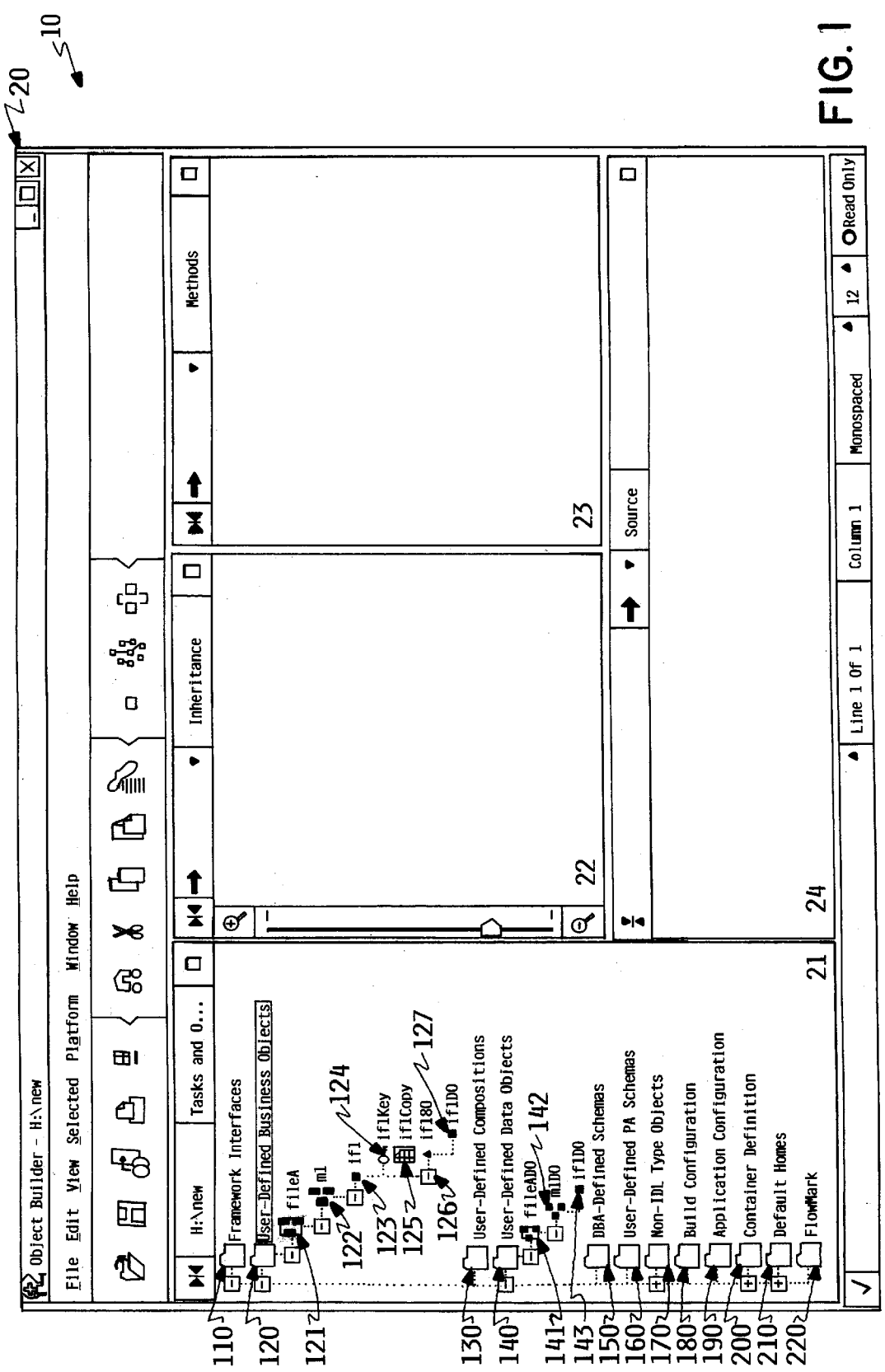
FIG. 1 is a diagrammatic representation of the main window of an object builder of the type suitable for a task oriented data model according to the present invention.

Reference is first made to FIG. 1, which shows in diagrammatic form an object builder tool 10 in the Component Broker toolkit. The object builder tool 10 is an application program which provides an integrated development environment for software developers. As shown in FIG. 1, the object builder tool 10 comprises a main window 20 having four panes denoted by 21, 22, 23, and 24 respectively. The main view pane 21 on the left side of the window 20 provides the main view which is a task tree view. The main view pane 21 is also the context for the content displayed in the three other panes 22, 23, and 24.

As shown in FIG. 1, the main view pane 21 comprises a "Framework Interfaces" item (or element) 110, a "User-Defined Business Objects" item 120, a "User-Defined Compositions" item 130, a "User-Defined Data Objects" item 140, a "DBA-Defined Schemas" item 150, a "User-Defined PA Schemas" item 160, a "Non-IDL Type Objects" item 170, a "Build Configuration" item 180, an "Application Configuration" item 190, a "Container Definition" item 200, a "Default Homes" item 210, and a "FlowMark" item 220.

Figure 2:
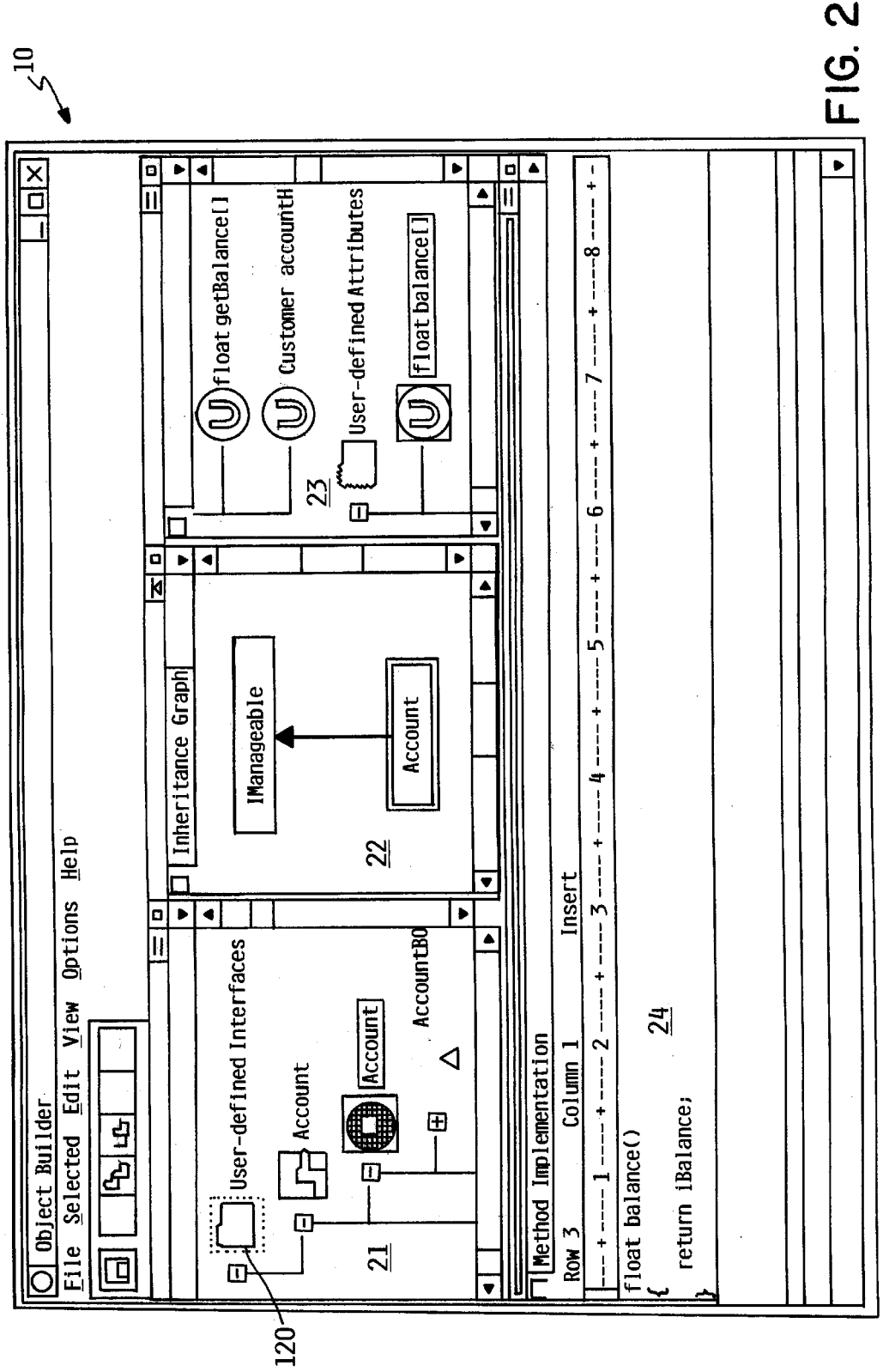
FIG. 2 shows the main window of the Component Broker object builder with an exemplary display of a user-defined interface object which has been selected.

The content of the other three panes 22, 23 and 24 in the window 10 depends on the selected item or element in the main view pane 21. Referring to FIG. 2, an item from "User-Defined Business Objects" item 120, specifically "Account", has been selected. In turn, the second pane 22 displays an inheritance graph for the Account item, and the third pane 23 shows the methods and attributes for the Account item. When one of the methods appearing in the third pane 23 is selected, the implementation of that method is shown in the fourth pane 24.

It will be appreciated that the object builder tool 10 utilizes a task tree structure. As shown in FIG. 1, the "User-Defined Business Objects" item 120 has a user interface which is organized as a task tree structure. The task-oriented structure of the user interface forces a user to follow a specified sequence in order to create a business object, i.e. an object containing business methods (logic) and data (state) that is intended for use within business applications. As will now be described, the data model according to the present invention comprises a task oriented structure which mirrors the user interface. The data model includes all the persistent meta-data which is used by the object builder tool 10.

Referring to FIG. 1, and specifically the main view pane 21, the task tree structure for the "User-Defined Business Objects" item 120 comprises a file item or element 121, a module item 122, an interface item 123, a key helper item 124, a copy helper item 125, a business object implementation item 126, and a data object item 127. The "User-Defined Data Objects" item 140 is also organized in a task tree structure and comprises a file item 141, a module item 142, and a interface item 142. Similar task tree structures are provided for the "DBA-Defined Schemas" item 150, the "Non-IDL Types Objects" item 170, the "Build Configuration" item 180, the "Application Configuration" item 190, and the "Container Definition" item 200.

According to the task tree structure for the "User-Defined Business Objects" item 120, a business object is created by the following sequence of steps: (1) create file; (2) create module; (3) create interface; (4) create key helper; (5) create copy helper; and (6) create implementation.

The first step performed by a user involves creating a file. The object builder 10 generates the file as an IDL (Interface Definition File). As will be understood by one skilled in the art, IDL is a contractual, neutral and declarative language that specifies an object's boundaries and its interfaces, e.g. the aspects of the object that are accessible to the public. IDL provides operating system and programming language independent interfaces to all services and components that reside on a bus as defined according to the CORBA (Common Object Request Broker Architecture) standard. The second step is optional and allows a user to define a module which comprises a grouping of interfaces. The third step performed by the user involves defining the public interface for the user-defined business object. The fourth step involves creating a key helper which comprises an object which provides a copy of the "identity" of the business object. The fifth step involves creating an object which duplicates everything about the business object, not just its identity. The sixth step comprises implementing the specific behaviour, i.e. methods, for the business object.

Similarly, according to the task tree structure for the "User-Defined Data Objects" item 140, a data object is created according to the following sequence of steps: (1) create file; (2) create module; and (3) create interface. A data object is an object that provides an object-oriented rendering of the application data.

According to the present invention, the data model comprises a task oriented structure which preserves the sequence of steps followed by a user during the creation of the object. The data content of the object, i.e. instance of data, is expressed by the object builder tool in the form of a text document. Since the data model mirrors the exact order in which the object was created by the user, the data model provides a structure from which the user interface of the object builder tool can be inferred. Because the user interface is implicit in the organization of the data model, the data model can be imported by another tool by simply following or scripting the data structure.

According to another aspect of the invention, the task oriented data model is implemented using the meta-data language XML (i.e. Extensible Markup Language) and a meta data model is implemented in the form of a Document Type Definition or DTD which is also expressed in XML. XML is a meta-data language which is self-descriptive of both services and information. In the context of the present invention, a meta data implementation is preferred because the data can be generically validated by reading or importing the data. The DTD (i.e. meta data model) is used for validating the correctness of the data model which is expressed in the form of an XML document.

According to this aspect of the present invention, the meta data model for the "User-Defined Business Objects" item 120 is specified in form of a Document Type Definition in XML as shown below.

```
<?xml encoding="US-ASCII"?>
<!ELEMENT UserDefinedBusinessObject (BusinessObjectUnit)*>
<!ELEMENT UserDefinedDataObject (DOFile)*>
<!ELEMENT BusinessObjectUnit (BOFile | CompositeFile)*>
<!ELEMENT DBADefinedSchemas (SchemaGroup)*>
<!ELEMENT UserDefinedPAOs (Schema)*>

<!--*******************BO File********************-->
<!ELEMENT BOFile (Comments | IncludeFile | Module | BOArtifact |
Constant | Enumeration | Exception | Structure | Typedef | Union | Uuid)*>
<!ATTLIST BOFile Name CDATA #IMPLIED>
<!ELEMENT Comments (#PCDATA)*>
<!ELEMENT IncludeFile (#PCDATA)*>
<!ELEMENT Uuid (#PCDATA)*>
```

-continued

```
<!--******************Composite File********************-->
<!ELEMENT CompositeFile (Comments | IncludeFile | Module | BOArtifact |
Constant | Enumeration | Exception | Structure | Typedef | Union | Uuid)*>
<!ATTLIST CompositeFile Name CDATA #IMPLIED>

<!--********************Module********************-->
<!ELEMENT Module (PCDATA | BOArtifact | DOArtifact | Comments | Constant | Enumeration | Exception |
Structure | Typedef | Union | Uuid)*>
<!ATTLIST Module Name CDATA #IMPLIED>

<!--********************DO File********************-->
<!ELEMENT DOFile (Comments | IncludeFile | Module | DOArtifact |
Constant | Enumeration | Exception | Structure | Typedef | Union | Uuid)*>
<!ATTLIST DOFile
Name CDATA #IMPLIED>

<!--******************BOArtifact******************-->
<!ELEMENT BOArtifact (InterFace | KeyArtifact | CopyArtifact | BOImplementation)*>
<!ELEMENT Interface (#PCDATA | IsQueryable | IsWLM | Comments | InterfaceInheritance | Attribute |
Method | Constant | Enumeration |
Exception | Structure | Typedef | Union | Uuid | ObjectRelationship | CompositeInfo)*>
<!ATTLIST Interface
Name CDATA #IMPLIED>
<!ELEMENT IsQueryable (#PCDATA)*>
<!ELEMENT IsWLM (#PCDATA)*>
<!ELEMENT InterfaceInheritance (#PCDATA)*>

<!--*****************CompositeInfo******************-->
<!ELEMENT CompositeInfo (CompositeRules | InterfaceReference)*>
<!ATTLIST CompositeInfo
CompositeToolMoniker CDATA #IMPLIED>

<!--*****************CompositeRules******************-->
<!ELEMENT CompositeRules (#PCDATA)*>

<!--*****************InterfaceReference******************-->
<!ELEMENT InterfaceReference EMPTY>
<!ATTLIST InterfaceReference
Referenced CDATA #IMPLIED
InstanceInterface CDATA #IMPLIED
InstanceName CDATA #IMPLIED
InstanceKind CDATA #IMPLIED>

<!--*****************DataReference******************-->
<!ELEMENT DataReference (Prereq | DataStore | Chain | Select)*>
<!ATTLIST DataReference
Type CDATA #IMPLIED
ReferencedCategory CDATA #IMPLIED
ReferencedInterface CDATA #IMPLIED
ReferencedName CDATA #IMPLIED
ReferencedKind CDATA #IMPLIED
InstanceInterface CDATA #IMPLIED
InstanceName CDATA #IMPLIED
InstanceKind CDATA #IMPLIED>

<!--*****************Prereq******************-->
<!ELEMENT Prereq (Prereq | DataStore | Chain | Select)*>
<!ATTLIST Prereq
ReferencedParameterName CDATA #IMPLIED
ReferencedParameterKind CDATA #IMPLIED
TargetInterface CDATA #IMPLIED
OperationName CDATA #IMPLIED
OperationKind CDATA #IMPLIED
ParameterName CDATA #IMPLIED
ParameterKind CDATA #IMPLIED
Helper CDATA #IMPLIED
ReferencedCategory CDATA #IMPLIED
ReferencedInterface CDATA #IMPLIED
ReferencedName CDATA #IMPLIED
ReferencedKind CDATA #IMPLIED
InstanceInterface CDATA #IMPLIED
InstanceName CDATA #IMPLIED
InstanceKind CDATA #IMPLIED>

<!--*****************DataStore******************-->
<!ELEMENT DataStore (#PCDATA)*>
<!ATTLIST DataStore
ReferencedCategory CDATA #IMPLIED
ReferencedInterface CDATA #IMPLIED
```

-continued

```
ReferencedName CDATA #IMPLIED
ReferencedKind CDATA #IMPLIED
InstanceInterface CDATA #IMPLIED
InstanceName CDATA #IMPLIED
InstanceKind CDATA #IMPLIED>

<!--******************Chain******************-->
<!ELEMENT Chain EMPTY>

<!--******************Select*
<!ELEMENT Select (NullAttribute)*>

<!--******************NullAttribute******************-->
<!ELEMENT NullAttribute (Prereq | DataStore | Chain | Select)*>
<!ATTLIST NullAttribute
AttributeInterface CDATA #IMPLIED
AttributeName CDATA #IMPLIED
AttributeKind CDATA #IMPLIED
Negated CDATA #IMPLIED
ReferencedCategory CDATA #IMPLIED
ReferencedInterface CDATA #IMPLIED
ReferencedName CDATA #IMPLIED
ReferencedKind CDATA #IMPLIED
InstanceInterface CDATA #IMPLIED
InstanceName CDATA #IMPLIED
InstanceKind CDATA #IMPLIED>

<!--******************DelegateToGroup******************-->
<!ELEMENT DelegateToGroup (#PCDATA)*>

<!--******************KeyAttrMapGroup******************-->
<!ELEMENT KeyAttrMapGroup (KeyAttrMapInfo)*>

<!--******************KeyAttrMapInfo******************-->
<!ELEMENT KeyAttrMapInfo (KeyAttrReference)*>
<!ATTLIST KeyAttrMapInfo
Interface CDATA #IMPLIED
AttributeName CDATA #IMPLIED
AttributeKind CDATA #IMPLIED>

<!--******************KeyAttrReference******************-->
<!ELEMENT KeyAttrReference (KeyAttributeReference | InstanceAttributeReference)*>

<!--******************KeyAttributeReference******************-->
<!ELEMENT KeyAttributeReference EMPTY>
<!ATTLIST KeyAttributeReference
Interface CDATA #IMPLIED
AttributeName CDATA #IMPLIED
AttributeKind CDATA #IMPLIED>

<!--******************InstanceAttributeReference******************-->
<!ELEMENT InstanceAttributeReference EMPTY>
<!ATTLIST InstanceAttributeReference
Interface CDATA #IMPLIED
AttributeName CDATA #IMPLIED
AttributeKind CDATA #IMPLIED>

<!--******************LocationGroup******************-->
<!ELEMENT LocationGroup (LocationByKey)*>

<!--******************LocationByKey******************-->
<!ELEMENT LocationByKey (InterfaceReference)*>
<!ATTLIST LocationByKey
Group CDATA #IMPLIED
FindObject CDATA #IMPLIED
CreateObject CDATA #IMPLIED
RemoveObject CDATA #IMPLIED
CreateFromCopy CDATA #IMPLIED
HomeName CDATA #IMPLIED
FactoryFinderName CDATA #IMPLIED
HomeParameter CDATA #IMPLIED>

<!--******************Object Relationship******************-->
<!ELEMENT ObjectRelationship (Uuid | ObjectType | ReferenceCollectionImplementation |
ReferenceResolvedByForeignKey |
HomeToQuery | Attribute | Method)*>
<!ATTLIST ObjectRelationship Name CDATA #IMPLIED>
<!ELEMENT ObjectType (#PCDATA)*>
<!ELEMENT ReferenceCollectionImplementation (#PCDATA)*>
```

-continued

```
<!ELEMENT ReferenceResolvedByForeignKey (#PCDATA)*>

<!--******************Construct******************-->
<!ELEMENT Constant (Type | Initializer | Size | Uuid)*>
<!ATTLIST Constant
Name CDATA #IMPLIED>
<!ELEMENT Enumeration (Member | Uuid)*>
<!ATTLIST Enumeration
Name CDATA #IMPLIED>
<!ELEMENT Exception (Member | Uuid)*>
<!ATTLIST Exception Name CDATA #IMPLIED>
<!ELEMENT Member (Type | Size | TypeSpecification | SequenceSize | ArraySize | CaseLabel | Uuid)*>
<!ATTLIST Member Name CDATA #IMPLIED>
<!ELEMENT TypeSpecification (#PCDATA)*>
<!ELEMENT SequenceSize (#PCDATA)*>
<!ELEMENT ArraySize (#PCDATA)*>
<!ELEMENT CaseLabel (#PCDATA)*>
<!ELEMENT Structure (Member | Uuid)*>
<!ATTLIST Structure Name CDATA #IMPLIED>
<!ELEMENT Typedef (Type | Size | TypeSpecification | SequenceSize | ArraySize | Uuid)*>
<!ATTLIST Typedef Name CDATA #IMPLIED>
<!ELEMENT Union (SwitchSpecifier | Member | Uuid)*>
<!ATTLIST Union Name CDATA #IMPLIED>
<!ELEMENT SwitchSpecifier (#PCDATA)*>

<!--******************Attribute******************-->
<!ELEMENT Attribute (Type | Initializer | Size | Implementation | Read-only | Overridable | (StringBehaviour?) |
GetterMethodBodyForPlatform | SetterMethodBodyForPlatform | GetterImplementationType |
SetterImplementationType | ParentInterface | DOAttributeName | Uuid DataReference | DelegateToGroup |
UsedInImplementation | StaticData |
GetterBodiesKeepAllPlatformsInSyncCpp |
GetterBodiesKeepAllPlatformsInSyncJava |
SetterBodiesKeepAllPlatformsInSyncCpp |
SetterBodiesKeepAllPlatformsInSyncJava)*>
<!ATTLIST Attribute
Name CDATA #IMPLIED>
<!ELEMENT Type (#PCDATA)>
<!ELEMENT Initializer (#PCDATA)*>
<!ELEMENT Size (#PCDATA)*>
<!ELEMENT Implementation (#PCDATA)>
<!ELEMENT Read-only (#PCDATA)>
<!ELEMENT Overridable (#PCDATA)>
<!ELEMENT StringBehaviour (#PCDATA)>
<!ELEMENT GetterImplementationType (#PCDATA)*>
<!ELEMENT SetterImplementationType (#PCDATA)*>
<!ELEMENT DOAttributeName (#PCDATA)*>
<!ELEMENT ParentInterface (#PCDATA)*>
<!ELEMENT UsedInimplementation (#PCDATA)*>
<!ELEMENT StaticData (#PCDATA)*>
<!ELEMENT GetterBodiesKeepAllPlatformsInSyncCpp (#PCDATA)*>
<!ELEMENT GetterBodiesKeepAllPlatformsInSyncJava (#PCDATA)*>
<!ELEMENT SetterBodiesKeepAllPlatformsInSyncCpp (#PCDATA)*>
<!ELEMENT SetterBodiesKeepAllPlatformsInSyncJava (#PCDATA)*>
<!ELEMENT GetterMethodBodyForPlatfonm (Language)*>
<!ATTLIST GetterMethodBodyForPlatform Name CDATA #IMPLIED>
<!ELEMENT SetterMethodBodyForPlatform (Language)*>
<!ATTLIST SetterMethodBodyForPlatform Name CDATA #IMPLIED>
<!--ELEMENT ImplementationLanguage ANY-->
<!ELEMENT Language (UseToolDef, UseFile, UseTDE,Filename?, ToolDef?,
UserDef?,((OOSQLSourceType?, OOSQLUserDef?) | (ESQLSourceType?, ESQLUserDef?))?)>
<!ATTLIST Language
Name CDATA #IMPLIED>
<!ELEMENT UseToolDef (#PCDATA)>
<!ELEMENT UseFile (#PCDATA)>
<!ELEMENT UseTDE (#PCDATA)>
<!ELEMENT Filename (#PCDATA)*>
<!ELEMENT ToolDef (#PCDATA)*>
<!ELEMENT UserDef(#PCDATA)*>
<!ELEMENT OOSQLSourceType (#PCDATA)*>
<!ELEMENT OOSQLUserDef (#PCDATA)*>
<!ELEMENT ESQLSourceType (#PCDATA)*>
<!ELEMENT ESQLUserDef(#PCDATA)*>

<!--******************Method******************-->
<!-- Preserve spaces and newline -->
<!ATTLIST Filename xml:space (default|preserve) "preserve">
<!ATTLIST ToolDef xml:space (default|preserve) "preserve">
<!ATTLIST UserDef xml:space (default|preserve) "preserve">
<!ATTLIST Comments xml:space (default|preserve) "preserve">
```

-continued

```
<!ATTLIST OOSQLUserDef xml:space (default|preserve) "preserve">
<!ATTLIST ESQLUserDef xml:space (default|preserve) "preserve">
<!-- Preserve spaces and newline -->
<!ELEMENT Method (ReturnType | Size | Implementation | MethodBodyForPlatform | One-way | Overridable |
ConstMethod | IsFrameworkMethod | ExceptionRaises | Context | Parameter | Uuid | ParentInterface |
DataReference | DelegateToGroup | MethodType | UsedInImplementation | StaticMethod | PushDownMethod |
MappedMethod | PlatformnSet | MethodBodiesKeepAllPlatformsInSyncCpp |
MethodBodiesKeepAllPlatformsInSyncJava)*>
<!ATTLIST Method
Name CDATA #IMPLIED>
<!ELEMENT ReturnType (#PCDATA)>
<!ELEMENT ConstMethod (#PCDATA)>
<!ELEMENT PushDownMethod (#PCDATA)*>
<!ELEMENT MappedMethod (#PCDATA)*>
<!ELEMENT MethodBodyForPlatform (Language)*>
<!ATTLIST MethodBodyForPlatform Name CDATA #IMPLIED>
<!ELEMENT ImplementationType (#PCDATA)*>
<!ELEMENT Designpattern (#PCDATA)*>
<!ELEMENT UseMacro (#PCDATA)>
<!ELEMENT One-way (#PCDATA)>
<!ELEMENT IsFrameworkMethod (#PCDATA)>
<!ELEMENT ExceptionRaises (#PCDATA)*>
<!ELEMENT Context (#PCDATA)*>
<!ELEMENT StaticMethod (#PCDATA)*>
<!ELEMENT PlatformSet (#PCDATA)>
<!ELEMENT MethodBodiesKeepAllPlatformsInSyncCpp (#PCDATA)*>
<!ELEMENT MethodBodiesKeepAllPlatformslnSyncJava (#PCDATA)*>
<!ELEMENT Parameter (ParameterType | Size | DirectionalAttr | Uuid )*>
<!ATTLIST Parameter
Name CDATA #IMPLIED>
<!ELEMENT ParameterType (#PCDATA)*>
<!ELEMENT DirectionalAttr (#PCDATA)*>
<!ELEMENT MethodType (#PCDATA)*>

<!--******************DOArtifact********************-->
<!ELEMENT DOArtifact (DOInterface | Comments)*>

<!--******************Key********************-->
<!ELEMENT KeyArtifact (#PCDATA | File | Module | Interface | Attribute | Method | InterfaceInheritance | Uuid
| Prologue | CppPrologue | JavaPrologue | Epilogue | CppEpilogue | JavaEpilogue | KeyAttrMapGroup)*>
<!ELEMENT File (#PCDATA | Uuid | IncludeFile | Comments )*>
<!ATTLIST File Name CDATA #IMPLIED>

<!--******************Copy********************-->
<!ELEMENT CopyArtifact (#PCDATA | File | Module | Interface | Attribute |
Method | InterFaceInheritance | Uuid | Prologue | CppPrologue |
JavaPrologue | Epilogue | CppEpilogue | JavaEpilogue)*>

<!--******************BO Implementation********************-->
<!ELEMENT BOImplementation (#PCDATA | File | Module | Interface | Pattern | LazyEvaluation |
DataObjectInterface | SessionableBO | ImplementationLanguage | UserData | ImplementationInheritance |
Attribute | Method | Prologue | CppPrologue | JavaPrologue | Epilogue | CppEpilogue | JavaEpilogue | Key | Copy
| Handle | DOInterface | MO | Uuid | LocationGroup | ObjectRelationship)*>
<!ELEMENT Pattern (#PCDATA)>
<!ELEMENT LazyEvaluation (#PCDATA)>
<!ELEMENT DataObjectInterface (#PCDATA)>
<!ELEMENT SessionableBO (#PCDATA)>
<!ELEMENT ImplementationLanguage (#PCDATA)*>
<!ELEMENT UserData (#PCDATA)*>
<!ELEMENT ImplementationInheritance (#PCDATA)>
<!ELEMENT Prologue (#PCDATA)*>
<!ELEMENT CppPrologue (#PCDATA)*>
<!ELEMENT JavaPrologue (#PCDATA)*>
<!ELEMENT Epilogue (#PCDATA)*>
<!ELEMENT CppEpilogue (#PCDATA)*>
<!ELEMENT JavaEpilogue (#PCDATA)*>
<!ELEMENT Key (#PCDATA)*>
<!ELEMENT Handle (#PCDATA)*>
<!-- Preserve spaces and newline -->
<!ATTLIST Prologue xml :space (default|preserve) "preserve">
<!ATTLIST CppPrologue xml:space (default|preserve) "preserve">
<!ATTLIST JavaPrologue xml:space (default|preserve) "preserve">
<!ATTLIST Epilogue xml:space (default|preserve) "preserve">
<!ATTLIST CppEpilogue xml:space (default|preserve) "preserve">
<!ATTLIST JavaEpilogue xml:space (default|preserve) "preserve">

<!--******************DO Stuff********************-->
<!ELEMENT DOInterface (File | Module | Interface | Comments | InterfaceInheritance | DOImplementation |
Attribute | Method | Constant | Enumeration | Exception | Structure | Typedef | Union | Uuid)*>
```

-continued

```
<!ATTLIST DOInterface
Name CDATA #IMPLIED>

<!--*******************DO Implementation*******************-->
<!ELEMENT DOImplementation (#PCDATA | File | Module | Interface |
Environment | PersistentBehaviour | DataAccessPattern | PointerHandle |
Key | Copy | ImplementationInheritance | Attribute | Method | Prologue | CppPrologue | JavaPrologue | Epilogue |
CppEpilogue | JavaEpilogue | PO | POMapping | Uuid)*>
<!ELEMENT Environment (#PCDATA)*>
<!ELEMENT PersistentBehaviour (#PCDATA)*>
<!ELEMENT DataAccessPattern (#PCDATA)*>
<!ELEMENT PointerHandle (#PCDATA)*>
<!ELEMENT Copy (#PCDATA)*>

<!--*****************PO Stuff*******************-->
<!ELEMENT PO (Uuid?, ShortName?, ModuleName?, JavaPackage?, JavaPath?,
PAOService?, POAccessType, Prologue?, CppPrologue?, JavaPrologue?, Epilogue?, CppEpilogue?,
JavaEpilogue?, BindFileName, Comments?, POAttribute*, POMethod*, Schema?)>
<!ATTLIST PO
Name CDATA #IMPLIED>
<!ELEMENT POAccessType (#PCDATA)>
<!ELEMENT BindFileName (#PCDATA)*>
<!ELEMENT POAttribute (Uuid?, Type, Size, ColumnName, KeySequenceNumber?, Key?, Getter?, Setter?,
GetterBodiesKeepAll PlatformsInSyncCpp?, SetterBodiesKeepAllPlatformsInSyncCpp?,
GetterMethodBodyForPlatform*, SetterMethodBodyForPlatform*)>
<!ATTLIST POAttribute Name CDATA #IMPLIED>
<!ELEMENT KeySequenceNum (#PCDATA)*>
<!ELEMENT KeySequenceNumber (#PCDATA)*>
<!ELEMENT POMethod (Uuid?, IsFrameworkMethod, MethodFunction?, Implementation, ReturnType,
POParameter*, PlatformSet?, MethodBodiesKeepAllPlatformsInSyncCpp?, MethodBodyForPlatform*)>
<!ATTLIST POMethod Name CDATA #IMPLIED>
<!ELEMENT POParameter (Type, Size?, ParmAccessType?)>
<!ATTLIST POParameter Name CDATA #IMPLIED>
<!ELEMENT ParmAccessType (#PCDATA)>

<!--*****************DOImpl->PO Mappings*******************-->
<!ELEMENT POMapping (AttributeMapping*, MethodMapping*)>
<!ELEMENT AttributeMapping (DataObjectAttribute, PatternType?,
PrimitiveMapping?,((POAttributeImplementation+, MappingHelper?) | (KeyMapping | StructMapping)*)?)>
<!ELEMENT DataObjectAttribute (#PCDATA)>
<!ELEMENT PatternType (#PCDATA)>
<!ELEMENT PrimitiveMapping (POAttributeImplementation+, MappingHelper?)>
<!ELEMENT POAttributeImplementation (POInstance, POInstanceAttribute)>
<!ELEMENT POInstance (#PCDATA)>
<!ELEMENT POInstanceAttribute (#PCDATA)>
<!ELEMENT MappingHelper (MappingHelperClass, MappingHelperToTarget, MappingHelperToSource)*>
<!ELEMENT MappingHelperClass (#PCDATA)*>
<!ELEMENT MappingHelperToTarget (#PCDATA)*>
<!ELEMENT MappingHelperToSource (#PCDATA)*>
<!ELEMENT KeyMapping (KeyFullName, HomeToQuery, (KeyAttributeMapping)*)>
<!ELEMENT KeyFullName (#PCDATA)>
<!ELEMENT HomeToQuery (#PCDATA)*>
<!ELEMENT KeyAttributeMapping (KeyAttribute, (POAttributeImplementation)*, MappingHelper?)>
<!ELEMENT KeyAttribute (#PCDATA)>
<!ELEMENT StructMapping (StructFullName, (StructAttributeMapping)*)>
<!ELEMENT StructFullName (#PCDATA)>
<!ELEMENT StructAttributeMapping (StructAttribute, PrimitiveMapping?, (KeyMapping | StructMapping)*)>
<!ELEMENT StructAttribute (#PCDATA)>
<!ELEMENT MethodMapping (DataObjectMethod, AlwaysCompletes,
(POMethodImplementation)*)>
<!ELEMENT POMethodImplementation (POInstance, POInstanceMethod)>
<!ELEMENT DataObjectMethod (#PCDATA)*>
<!ELEMENT AlwaysCompletes (#PCDATA)*>
<!ELEMENT POInstanceMethod (#PCDATA)>

<!--*****************Schema Stuff*******************-->
<!ELEMENT
Schema (((DatabaseName, UserName?, SchemaName, ContainedBySchemaGroup,
DatabaseType?, SchemaType, PKConstraint?, PKConstraintComment?, Comments?, SQLFilename,
Column*,((ForeignKey*) (ViewSelect?, ViewFrom?, ViewWhere?, ViewOrderby?, ViewGroupby?,
ViewHaving?, IsUserWrittenClause?, ViewSchema+, ViewColumnMapping?))) (SchemaName, ShortName,
ModuleName, SchemaType, JavaPackage, JavaPath, JavaClassName, PAOService, Property*,
SchemaMethod*)), PO*)>
<!ATTLIST Schema
Name CDATA #IMPLIED>
<!ELEMENT ContainedBySchemaGroup (#PCDATA)*>
<!ELEMENT DatabaseName (#PCDATA)>
<!ELEMENT UserName (#PCDATA)*>
<!ELEMENT SchemaName (#PCDATA)>
```

-continued

```
<!ELEMENT ShortName (#PCDATA)>
<!ELEMENT ModuleName (#PCDATA)>
<!ELEMENT SchemaType (#PCDATA)>
<!ELEMENT PKConstraint (#PCDATA)*>
<!ELEMENT PKConstraintComment (#PCDATA)*>
<!ELEMENT SQLFilename (#PCDATA)*>
<!ELEMENT JavaPackage (#PCDATA)>
<!ELEMENT JavaPath (.PCDATA)>
<!ELEMENT JavaClassName (#PCDATA)>
<!ELEMENT PAOService (#PCDATA)>
<!ELEMENT SchemaMethod (Uuid?, IsFrameworkMethod, MethodFunction?, Implementation, ReturnType,
SchemaParameter*)>
<!ATTLIST SchemaMethod Name CDATA #IMPLIED>
<!ELEMENT MethodFunction (#PCDATA)*>
<!ELEMENT SchemaParameter (Type, Size?)>
<!ATTLIST SchemaParameter Name CDATA #IMPLIED>
<!ELEMENT Column (ColumnName, ColumnType, NotNull, KeySequenceNumber, ColumnSequenceNumber,
Length, Scale, ForBitData, Comments)>
<!ATTLIST Column
Name CDATA #IMPLIED>
<!ELEMENT ColumnName (#PCDATA)>
<!ELEMENT ColumnType (#PCDATA)>
<!ELEMENT NotNull (#PCDATA)>
<!ELEMENT ColumnSequenceNumber (# PCDATA)*>
<!ELEMENT Length (#PCDATA)>
<!ELEMENT Scale (#PCDATA)>
<!ELEMENT ForBitData (#PCDATA)>
<!ELEMENT Property (TypeString, TypeQualifier, Size, Key?, Getter?, Setter?, Uuid?)>
<!ATTLIST Property
Name CDATA #IMPLIED>
<!ELEMENT TypeString (#PCDATA)>
<!ELEMENT TypeQualifier (#PCDATA)>
<!ELEMENT Getter (#PCDATA)>
<!ELEMENT Setter (#PCDATA)>
<!ELEMENT ForeignKey (IsUnnamed, ForeignKeyName?, TargetSchema,
Comments, FKMapping*)>
<!ATTLIST ForeignKey Name CDATA #IMPLIED>
<!ELEMENT ForeignKeyName (#PCDATA)*>
<!ELEMENT IsUnnamed (#PCDATA)>
<!ELEMENT TargetSchema (DatabaseName, UserName?, SchemaName, ContainedBySchemaGroup)>
<!ELEMENT FKMapping (OwningAttribute, TargetAttribute)>
<!ELEMENT OwningAttribute (#PCDATA)>
<!ELEMENT TargetAttribute (#PCDATA)>
<!ELEMENT ViewSelect (#PCDATA)*>
<!ELEMENT ViewFrom (#PCDATA)*>
<!ELEMENT ViewWhere (#PCDATA)*>
<!ELEMENT ViewOrderby (#PCDATA)*>
<!ELEMENT ViewGroupby (#PCDATA)*>
<!ELEMENT ViewHaving (#PCDATA)*>
<!ELEMENT IsUserWrittenClause (#PCDATA)*>
<!ELEMENT ViewSchema (DatabaseName, UserName?, SchemaName, ContainedBySchemaGroup)>
<!ELEMENT ViewColumnMapping (ViewColumn*)>
<!ELEMENT ViewColumn (TargetSchema, TargetColumn)>
<!ATTLIST ViewColumn Name CDATA #IMPLIED>
<!ELEMENT TargetColumn (#PCDATA)*>

<!--*****************SchemaGroup Stuff*******************-->
<!ELEMENT SchemaGroup (DatabaseName?, DatabaseType?, DDLFilename?, EditGeneratedFile?, Schema*)>
<!ATTLIST SchemaGroup
Name CDATA #IMPLIED>
<!ELEMENT DatabaseType (#PCDATA)*>
<!ELEMENT DDLFilename (#PCDATA)*>
<!ELEMENT EditGeneratedFile (#PCDATA)*>

<!--******************MO Stuff*******************-->
<!ELEMENT MO (File | Module | Interface | ImplementationInheritance |
MOApplication | Adaptor | Uuid)*>
<!ELEMENT MOApplicationAdaptor (#PCDATA)*>
<!-- UDBO ? -->
```

As shown above the meta data model comprises a Document Type Definition (DTD) which specifies the set of required and optional elements, and their attributes, for the data models which are expressed as XML documents. In addition, the DTD specifies the names of the tags and the relationships among elements in the data model, i.e. XML document. It will also be appreciated that the task tree elements for the "User-Defined Business Objects" item 120 are expressed using containment relationships in the Document Type Definition shown above. For example, the file element or item 121 is defined as <!ELEMENT BOFile (Comments| . . . |Uuid)*>, and the module item 122 is defined as <!ELEMENT Module (#PCDATA| . . . Uuid)*>. Similarly, in the DTD the "attributes" of the object are defined as <!ELEMENT Attribute (Type |Initializer| ...)*>, and the "methods" of the object are defined as <!ELEMENT Method (ReturnType| ...)*>. The specific syntax of the meta data model expressed in the above DTD will be within the understanding of those familiar with XML.

Next, the meta data model according to the present invention for the "Non-IDL Type Objects" item 170 is specified in the form a Document Type Definition as shown below.

```
<?xml encoding="US-ASCII"?>
<!ELEMENT NonIDLTypeDefinition (NonIDLType)*>
<!ELEMENT NonIDLType (ImplementationLanguage |
    ImplementationForPlatform | PackageName | Uuid)*>
<!ATTLIST NonIDLType
Name CDATA #IMPLIED>
<!ELEMENT ImplementationLanguage (#PCDATA)*>
<!ELEMENT Uuid (#PCDATA)*>
<!ELEMENT PackageName (#PCDATA)*>
<!ELEMENT ImplementationForPlatform ( HeaderFile | LibraryName)*>
<!ATTLIST ImplementationForPlatformName CDATA #IMPLIED>
<!ELEMENT HeaderFile (#PCDATA)*>
<!ELEMENT LibraryName (#PCDATA)*>
<!-- NonIDLType ? -->
```

The specific syntax of the meta data model for the "Non-IDL Type Objects" item as expressed in the above DTD will be within the understanding of those familiar with XML.

The meta data model according to the present invention for the "Build Configuration" item 180 is specified in the form of a Document Type Definition as shown below.

```
<?xml encoding="US-ASCII"?>
<!ELEMENT BuildConfiguration (DLLUnit)*>
<!ELEMENT DLLUnit (Uuid | Tier | Description | ApplicablePlatforms |
    MakefileOptionsForPlatform | FilesInDLL | LinkLibInDLL)*>
<!ELEMENT MakefileOptionsForPlatform (LibraryName | MakeOptions |
    IDLCompile | JavaCompile | JCBJavaCompile |
    CPPCompile | LinkOptions)*>
<!ATTLIST DLLUnit Name CDATA #IMPLIED>
<!ATTLIST MakefileOptionsForPlatformName CDATA #IMPLIED>
<!ELEMENT Uuid (#PCDATA)*>
<!ELEMENT Tier (#PCDATA)*>
<!ELEMENT ApplicablePlatforms (#PCDATA)*>
<!ELEMENT Description (#PCDATA)*>
<!ELEMENT LibraryName (#PCDATA)*>
<!ELEMENT MakeOptions (#PCDATA)*>
<!ELEMENT IDLCompile (#PCDATA)*>
<!ELEMENT JavaCompile (#PCDATA)*>
<!ELEMENT JCBJavaCompile (#PCDATA)*>
<!ELEMENT CPPCompile (#PCDATA)*>
<!ELEMENT LinkOptions (#PCDATA)*>
<!ELEMENT FilesInDLL (File)*>
<!ELEMENT File (#PCDATA)*>
<!ELEMENT LinkLibInDLL (LinkLib)*>
<!ELEMENT LinkLib (#PCDATA)*>
<!-- DLL ? -->
```

The specific syntax of the meta data model for the "Build Configuration" item as shown in the above DTD will be within the understanding of those familiar with XML.

The meta data model according to the present invention for the "Application Configuration" item 190 is specified in the form of a Document Type Definition as shown below.

```
<?xml encoding="US-ASCII"?>
=<!ELEMENT ApplicationConfiguration (ApplicationFamilyUnit)*>
<!ELEMENT ApplicationFamilyUnit (Description | Version | DiskSpace |
    Readme | Application | Uuid)*>
```

-continued

```
<!ATTLIST ApplicationFamilyUnit
Name CDATA #IMPLIED>
<!ELEMENT Description (#PCDATA)*>
<!ELEMENT Version (#PCDATA)*>
<!ELEMENT DiskSpace (#PCDATA)*>
<!ELEMENT Readme (#PCDATA)*>
<!ELEMENT Uuid (#PCDATA)*>
<!--*****************Application*******************-->
<!ELEMENT Application ( (Description, Version, JavaVM, InitialState?,
    Executable*) | ManagedObject | Uuid)*>
<!ATTLIST Application
Name CDATA #IMPLIED>
<!ELEMENT JavaVM (#PCDATA)*>
<!ELEMENT InitialState (#PCDATA)*>
<!ELEMENT Executable (#PCDATA)*>
<!--*****************Managed Object*******************-->
<!ELEMENT ManagedObject ( Dll | Key | Copy | DOImpl |
    ContainerName | Home | NameOfFactory | NameOfHome |
    NameContexts VisibleInCell | VisibleInWorkGroup |
    WorkLoadManaged | State | Uuid)*>
<!ATTLIST ManagedObject Name CDATA #IMPLIED>
<!ELEMENT Dll (#PCDATA)*>
<!ELEMENT Key (Dll)>
<!ATTLIST Key Name CDATA #IMPLIED>
<!ELEMENT Copy (Dll)*>
<!ATTLIST Copy Name CDATA #IMPLIED>
<!ELEMENT DOImpl (Dll)>
<!ATTLIST DOImpl Name CDATA #IMPLIED>
<!ELEMENT ContainerName (#PCDATA)>
<!ELEMENT Home (CustomizedHome | Dll)*>
<!ATTLIST Home Name CDATA #IMPLIED>
<!ELEMENT CustomizedHome (#PCDATA)>
<!ELEMENT NameOfFactory (#PCDATA)*>
<!ELEMENT NameOfHome (#PCDATA)*>
<!ELEMENT NameContexts (#PCDATA)*>
<!ELEMENT VisibleInCell (#PCDATA)>
<!ELEMENT VisibleInWorkGroup (#PCDATA)>
<!ELEMENT WorkLoadManaged (#PCDATA)>
<!ELEMENT State (#PCDATA)>
<!-- APPL ? -->
```

The specific syntax of the meta data model for the "Application Configuration" item as shown in the above DTD will be within the understanding of those familiar with XML.

The meta data model according to the present invention for the "Container Definition" item 200 is specified in the form of a Document Type Definition as shown below.

```
<?xml encoding="US-ASCII"?>
<!ELEMENT ContainerDefinition (Container)*>
<!ELEMENT Container (Uuid | Description | NumberOfComponents |
    TransactionPolicy | TerminationPolicy | PassivationPolicy |
    PersistentReferences | BOPattern | DOPattern |
    CachingServices | HomeServices | WorkLoadManaged |
    PolicyGroup | UsesSession | SessionPolicy |
    SessionConnectionType | SessionConnectionName | SessionPriority |
    PAAService )*>
<!ATTLIST Container Name CDATA #IMPLIED>
<!ELEMENT Uuid (#PCDATA)*>
<!ELEMENT Description (#PCDATA)*>
<!ELEMENT NumberOfComponents (#PCDATA)*>
<!ELEMENT TransactionPolicy (#PCDATA)*>
<!ELEMENT TerminationPolicy (#PCDATA)*>
<!ELEMENT PassivationPolicy (#PCDATA)*>
<!ELEMENT PersistentReferences (#PCDATA)*>
<!ELEMENT BOPattern (#PCDATA)*>
<!ELEMENT DOPattern (#PCDATA)*>
<!ELEMENT CachingServices (#PCDATA)*>
<!ELEMENT HomeServices (#PCDATA)*>
<!ELEMENT WorkLoadManaged (#PCDATA)*>
<!ELEMENT PolicyGroup (#PCDATA)*>
<!ELEMENT UsesSession (#PCDATA)*>
<!ELEMENT SessionPolicy (#PCDATA)*>
<!ELEMENT SessionConnectionType (#PCDATA)*>
```

```
-continued

<!ELEMENT SessionPriority (#PCDATA)*>
<!ELEMENT SessionConnectionName (#PCDATA)*>
<!ELEMENT PAAService (#PCDATA)*>
<!-- CONT ? -->
```

The specific syntax of the meta data model for the "Container Definition" item as shown in the above DTD will be within the understanding of those familiar with XML.

The DTD's shown above provide the meta data models which define the content and arrangement of the data models (i.e. XML documents) generated by the object builder tool 10, and the specified tags provide a mechanism for interpreting the data elements expressed in the XML document. When an XML document is imported by an object builder tool or some other XML compatible tool, the XML document is parsed and rendered according to the specifications in the meta data model, i.e. the DTD. Because the DTD provides a description of the data model, an application can validate that the XML document conforms to its specified structure, i.e. data model. This validation can be automated as the XML language is machine readable.

The task oriented data model for the object builder as specified in the DTD's above allows the data to be exported and imported with the following granularity: (1) the entire data model; (2) all business objects under the task tree for the "User-Defined Business Objects" item 120 (FIG. 1); (3) a single Business Object unit; (4) all data objects under the task tree for the "User-Defined Data Objects" item 140 (FIG. 1); (5) a single Data Object unit; (5) all schemas under the task tree for the "DBA-Defined Schemas" item 150 (FIG. 1); (6) all nonIDL types under the task tree for the "Non-IDL Type Objects" item 170 (FIG. 1); (7) all makefiles under the task tree for the "Build Configuration" item 180 (FIG. 1); (8) all application families under the task tree for the "Application Configuration" item 190 (FIG. 1); (9) all containers under the task tree for the "Container Definition" item 200 (FIG. 1).

Advantageously, the human-readable form of the data model (i.e. the XML document) and the meta data model (i.e. the DTD) allow a user to directly examine the data model and quickly locate the data element or item of interest.

The present invention may be embodied in other specific forms without departing from the spirit or essential characteristics thereof. For example, while the task oriented data model was described in the context of an XML implementation, it will be understood that implementations using other meta data language specifications can be used. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

The invention may be implemented as a computer program product comprising a program storage device and means recorded on said program storage device for instructing a computer to perform the steps of the invention and as a data structure embodied in a program storage device. Such a program storage device may include diskettes, optical discs, tapes, CD-ROMS, hard drives, memory including ROM or RAM, computer tapes or other storage media capable of storing a computer program.

The invention may also be implemented in a computer system. In a preferred embodiment, a system is provided comprising a computer program operating on a data processing system, with the computer program embodying the method of the invention and producing an output of the method on a display or output device. Data processing systems include computers, computer networks, embedded systems and other systems capable of executing a computer program. A computer includes a processor and a memory device and optionally, a storage device, a video display and/or an input device. Computers may equally be in stand-alone form (such as the traditional desktop personal computer) or integrated into another apparatus (such as a cellular telephone).

While this invention has been described in relation to preferred embodiments, it will be understood by those skilled in the art that changes in the details of processes and structures may be made without departing from the spirit and scope of this invention. Many modifications and variations are possible in light of the above teaching. Thus, it should be understood that the above described embodiments have been provided by way of example rather than as a limitation and that the specification and drawing are, accordingly, to be regarded in an illustrative rather than a restrictive sense.

I claim:

1. A computer program product for an object oriented application program for creating objects, the application program having a user interface for supporting the creation of objects, said user interface comprising a plurality of items, said items defining a sequence of tasks for creating the objects, and said application program including an export utility for exporting document files, said computer program product comprising:

a program storage device having recorded thereon a plurality of machine-readable instructions, said instructions instructing a computer to generate document files for export, and to export said document files, wherein:

(a) each said document file expresses at least a portion of a respective data model, each data model comprising a plurality of objects, each of said objects corresponding to a respective task in said sequence of tasks for creating the objects, each said document file being expressed according to a meta data programming language;

(b) each said document file comprises a non-empty subset of a plurality of data elements corresponding to the plurality of objects of the respective data model, each of said data elements corresponding to a respective task in said sequence of tasks for creating the objects;

(c) said data elements are arranged according to a meta data model;

(d) said meta data model mirrors the sequence of tasks defined in the user interface; and (e) said instructions of said program storage device are capable of generating a first document file expressing a first data model, said first document file containing all of said plurality of data elements corresponding to the plurality of objects of the first data model, and a second document file expressing a portion of said first data model, said second document file containing fewer than all of said plurality of data elements corresponding to the plurality of objects of the first data model.

2. The computer program product as claimed in claim 1, wherein said meta data model includes means for validating each of the data elements in said document file.

3. The computer program product as claimed in claim 2, wherein:

(i) said meta data language comprises Extensible Markup Language (XML); and (ii) said means for validating comprises a Document Type Definition specified in XML.

4. The computer program product claimed in claim 1, wherein said meta data language comprises XML or Extensible Markup Language, and said data elements being arranged according to containment constructs specified in said meta data model.

5. A computer system supporting data exportation, comprising:

a processor;

a memory device for storing application programs;

a display outputting information to a user;

an object-oriented application program executable on said processor, said application program supporting the creation of objects, said application program having a user interface for supporting the creation of objects, said user interface comprising a plurality of items, said items defining a sequence of tasks for creating the objects; and an export utility for exporting document files for use by said application program, wherein said export utility generates document files for export and exports said document files;

wherein each said document file expresses at least a portion of a respective data model, each data model comprising a plurality of objects, each of said objects corresponding to a respective task in said sequence of tasks for creating the objects, each said document file being expressed according to a meta data programming language;

wherein each said document file comprises a non-empty subset of a plurality of data elements corresponding to the plurality of objects of the respective data model, each of said data elements corresponding to a respective task in said sequence of tasks;

wherein said data elements are arranged according to a meta data model;

wherein said meta data model mirrors the sequence of tasks defined in the user interface; and wherein said export utility is capable of generating a first document file expressing a first data model, said first document file containing all of said plurality of data elements corresponding to the plurality of objects of the first data model, and a second document file expressing a portion of said first data model, said second document file containing fewer than all of said plurality of data elements corresponding to the plurality of objects of the first data model.

6. The computer system as claimed in claim 5, wherein said meta data model includes means for validating each of the data elements in said document file.

7. The computer system as claimed in claim 6, wherein:

(i) said meta data language comprises Extensible Markup Language (XML); and (ii) said means for validating comprises a Document Type Definition specified in XML.

8. The computer system claimed in claim 5, wherein said meta data language comprises XML or Extensible Markup Language, and said data elements being arranged according to containment constructs specified in said meta data model.

9. The computer system as claimed in claim 5, wherein said second document file contains only a single data element of said plurality of data elements corresponding to the plurality of objects of the first data model.

10. The computer system as claimed in claim 5, wherein said export utility is capable of generating a set of document files each expressing a respective portion of said first data model, each document file of said set of document files corresponding to a respective level of granularity, each level of granularity corresponding to a hierarchical level of a task tree of said user interface, wherein each document file of said set of document files contains all data elements corresponding to a respective subset of the plurality of objects of said first data model under the task tree at the corresponding level of granularity of the document file.

11. The computer program product as claimed in claim 1, wherein said second document file contains only a single data element of said plurality of data elements corresponding to the plurality of objects of the first data model.

12. The computer program product as claimed in claim 5, wherein said instructions of said program storage device are capable of generating a set of document files each expressing a respective portion of said first data model, each document file of said set of document files corresponding to a respective level of granularity, each level of granularity corresponding to a hierarchical level of a task tree of said user interface, wherein each document file of said set of document files contains all data elements corresponding to a respective subset of the plurality of objects of said first data model under the task tree at the corresponding level of granularity of the document file.

* * * * *